(12) United States Patent
Guerzoni

(10) Patent No.: US 10,438,070 B2
(45) Date of Patent: Oct. 8, 2019

(54) SURVEILLANCE METHOD, DEVICE AND SYSTEM

(71) Applicants: Filippo Guerzoni, Modena (IT); Cesare Micheli, Parma (IT)

(72) Inventor: Filippo Guerzoni, Modena (IT)

(73) Assignees: Filippo Guerzoni, Modena (IT); Cesare Micheli, Parma (IT)

( * ) Notice: Subject to any disclaimer, the term of this patent is extended or adjusted under 35 U.S.C. 154(b) by 152 days.

(21) Appl. No.: 15/504,097

(22) PCT Filed: Sep. 24, 2015

(86) PCT No.: PCT/IB2015/057354
§ 371 (c)(1),
(2) Date: Feb. 15, 2017

(87) PCT Pub. No.: WO2016/046780
PCT Pub. Date: Mar. 31, 2016

(65) Prior Publication Data
US 2017/0255833 A1     Sep. 7, 2017

(30) Foreign Application Priority Data
Sep. 25, 2014 (IT) .............................. BO2014A0526

(51) Int. Cl.
*G06K 9/00* (2006.01)
*G08B 13/196* (2006.01)
(Continued)

(52) U.S. Cl.
CPC ..... *G06K 9/00771* (2013.01); *G06K 9/00718* (2013.01); *G06K 9/78* (2013.01);
(Continued)

(58) Field of Classification Search
CPC .. G06K 9/00771; G06K 9/00718; G06K 9/78; H04N 7/183; H04N 5/2253;
(Continued)

(56) References Cited

U.S. PATENT DOCUMENTS 4,318,088 A * 3/1982 Hunter ................. G08B 13/122
174/158 F
6,675,095 B1 * 1/2004 Bird ...................... G05D 1/0061
340/436

(Continued)

FOREIGN PATENT DOCUMENTS

| DE | 10310767 A1 | 11/2003 |
|---|---|---|
| WO | WO2006046234 A2 | 5/2006 |
| WO | WO2009017687 A1 | 2/2009 |

OTHER PUBLICATIONS

International Search Report and Written Opinion dated Dec. 7, 2015 from counterpart PCT Application No. PCT/IB2015/057354.

*Primary Examiner* — Joseph Suh
(74) *Attorney, Agent, or Firm* — Shuttleworth & Ingersoll, PLC; Timothy J. Klima

(57) ABSTRACT

A method for surveillance of a predetermined volume comprising the following steps:
a) preparing at least one video camera designed to acquire images of a predetermined volume which is under surveillance;
b) defining in the images at least a first predetermined authorized region having a first level of authorization and at least a second predetermined unauthorized region,
c) analyzing the images to identify a moving object and to identify at least one position associated with the moving object;
d) comparing the position of the moving object identified with the positions of the above-mentioned authorized region and/or unauthorized region;
(Continued)

e) making available an alarm indication depending on the results of the comparison.

15 Claims, 2 Drawing Sheets

(51) Int. Cl.
  *G06T 7/246* (2017.01)
  *G06T 7/70* (2017.01)
  *G06K 9/78* (2006.01)
  *H04N 5/225* (2006.01)
  *H04N 7/18* (2006.01)

(52) U.S. Cl.
  CPC ............ *G06T 7/248* (2017.01); *G06T 7/70* (2017.01); *G08B 13/19606* (2013.01); *G08B 13/19652* (2013.01); *H04N 5/2253* (2013.01); *H04N 7/183* (2013.01); *G06T 2207/10016* (2013.01); *G06T 2207/30232* (2013.01); *G06T 2207/30241* (2013.01)

(58) Field of Classification Search
  CPC . G06T 7/248; G06T 7/70; G06T 2207/10016; G06T 2207/30232; G06T 2207/30241; G08B 13/19606; G08B 13/19652
  See application file for complete search history.

(56) References Cited

U.S. PATENT DOCUMENTS

| | | | |
|---|---|---|---|
| 7,164,116 B2 | 1/2007 | Akagi | |
| 8,427,324 B2* | 4/2013 | Cuddihy | G06K 9/00369 340/573.1 |
| 8,711,217 B2* | 4/2014 | Venetianer | G06F 17/3079 348/143 |
| 9,019,381 B2* | 4/2015 | Guler | G01S 3/7864 348/169 |
| 9,852,342 B2* | 12/2017 | Kanga | G08B 13/19671 |
| 9,965,140 B2* | 5/2018 | Gabara | G06T 17/05 |
| 9,996,752 B2* | 6/2018 | Pham | G06T 7/0028 |
| 2002/0067259 A1* | 6/2002 | Fufidio | G07C 9/00031 340/541 |
| 2005/0057653 A1* | 3/2005 | Maruya | G08B 13/19608 348/159 |
| 2005/0163346 A1* | 7/2005 | van den Bergen | G06K 9/00771 382/103 |
| 2009/0219387 A1 | 9/2009 | Marman et al. | |
| 2009/0295534 A1* | 12/2009 | Golander | G07C 9/00111 340/5.2 |
| 2010/0097470 A1* | 4/2010 | Yoshida | G08B 13/19641 348/159 |
| 2011/0145257 A1* | 6/2011 | McDonald | G06T 1/00 707/743 |
| 2012/0086780 A1* | 4/2012 | Sharma | G06K 9/00771 348/46 |
| 2012/0274466 A1* | 11/2012 | Mezger | G08B 13/183 340/557 |
| 2013/0194403 A1* | 8/2013 | Higuchi | H04N 5/23251 348/65 |
| 2014/0063280 A1* | 3/2014 | Tokimoto | G06K 9/00221 348/222.1 |
| 2014/0132758 A1* | 5/2014 | Saptharishi | H04N 7/18 348/135 |
| 2015/0050922 A1* | 2/2015 | Ramalingam | H04W 12/08 455/418 |
| 2015/0187191 A1* | 7/2015 | Guerzoni | G08B 13/00 340/541 |
| 2015/0189140 A1* | 7/2015 | Sutton | H04N 5/2257 348/208.1 |
| 2015/0218844 A1* | 8/2015 | Adair | E04H 13/006 705/26.3 |
| 2015/0344010 A1* | 12/2015 | Kurtovic | B60T 8/1708 701/70 |
| 2015/0374895 A1* | 12/2015 | Friederichs | A61M 1/1672 210/87 |
| 2016/0018228 A1* | 1/2016 | Parker | G01C 21/3623 701/412 |
| 2016/0025846 A1* | 1/2016 | Mostov | G06K 9/00771 342/28 |
| 2016/0210756 A1* | 7/2016 | Konishi | G06T 7/20 |
| 2016/0232774 A1* | 8/2016 | Noland | G08B 13/1672 |
| 2017/0255833 A1* | 9/2017 | Guerzoni | G08B 13/19606 |

* cited by examiner

SURVEILLANCE METHOD, DEVICE AND SYSTEM

This application is the National Phase of International Application PCT/IB2015/057354 filed Sep. 24, 2015 which designated the U.S.

This application claims priority to Italian Patent Application No. BO2014A000526 filed Sep. 25, 2014, which application is incorporated by reference herein.

TECHNICAL FIELD

This invention relates to a device, a system and a method for surveillance of a predetermined volume, that is, a surveillance area (both inside and outside of buildings).

BACKGROUND ART

Surveillance systems are known in the sector in question which allow the surveillance of predetermined zones.

These surveillance systems are generally equipped with sensors of various types which allow the accesses to the building (for example, the doors, windows etc.) to be monitored.

A first drawback of this type of security/surveillance system is due to the fact that these systems do not have the possibility of distinguishing whether the person accessing the monitored volume is authorised or not to access the volume and above all they have a considerable limitation resulting from the failure to identify the outlines of the areas in question.

This means that these systems are generally activated only in the absence of persons in the protected area and they must therefore be deactivated if that is not the case; otherwise, these systems can generate numerous "false alarms", that is, unwanted warning signals, not relative to an intrusion situation.

There has therefore been a long felt need for the provision of a security/surveillance system which can be kept operational also in the presence of persons in the predetermined zone, thus guaranteeing a greater security for the occupants of the zone.

A further requirement by the user is that of having a security/surveillance system which is particularly simple and effective.

DISCLOSURE OF THE INVENTION

The aim of the present invention is, therefore, to overcome these drawbacks and to satisfy the above-mentioned requirements by providing a method, a device and a system for surveillance of a predetermined volume (both inside and outside a building).

According to the invention, this aim is achieved by a method, a device and a system comprising the technical features described in one or more of the appended claims.

BRIEF DESCRIPTION OF DRAWINGS

The technical features of the invention, with reference to the above aims, are clearly described in the claims below and its advantages are apparent from the detailed description which follows, with reference to the accompanying drawings which illustrate a non-limiting example embodiment of the invention and in which:

DETAILED DESCRIPTION OF PREFERRED EMBODIMENTS OF THE INVENTION

Figure 1A:
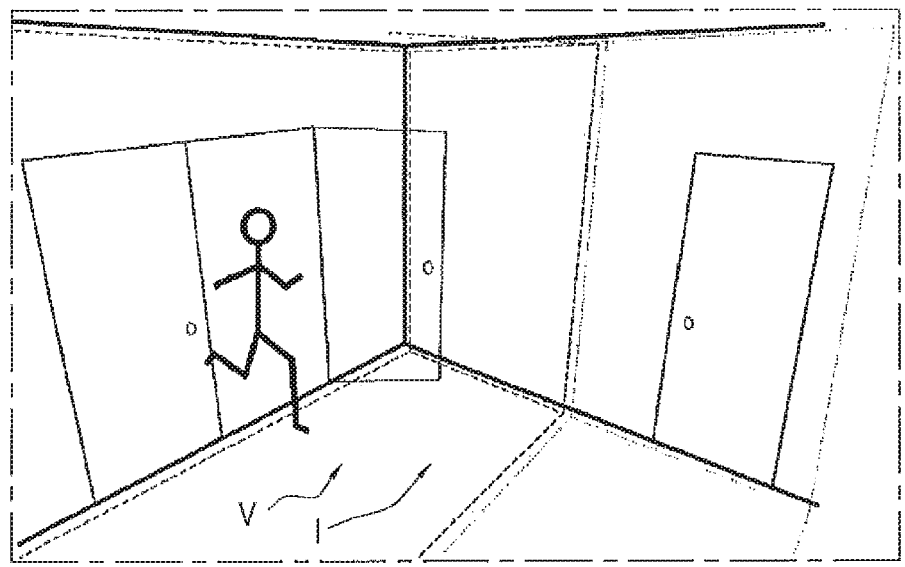
FIG. 1A illustrates a scene of an inside environment captured by the video camera where the unauthorised (dashed line)/authorised (dotted line) volumes are highlighted in three dimensions.
Figure 1B:
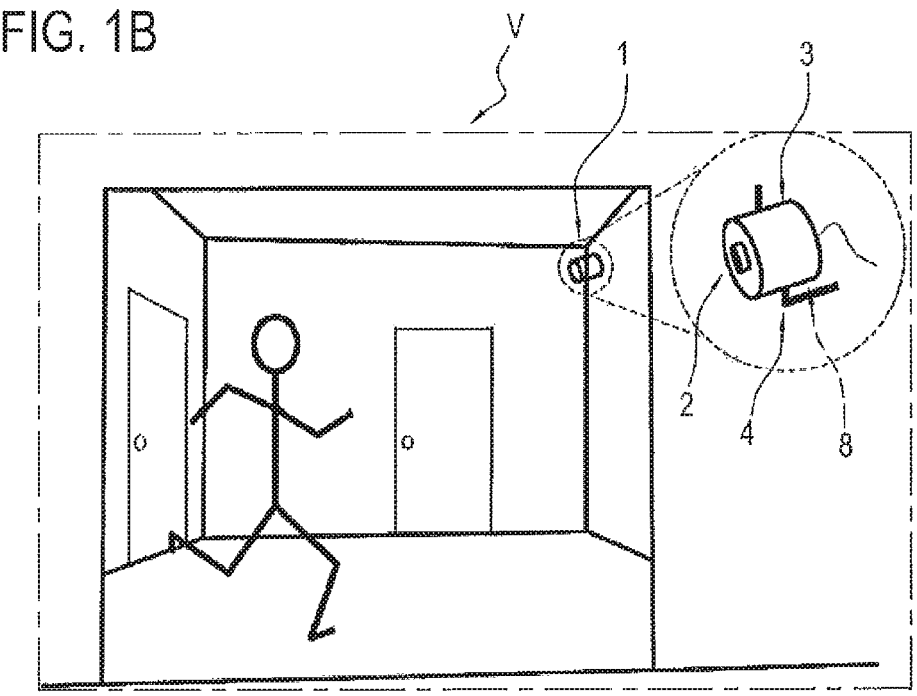
FIG. 1B illustrates a scene showing an inside environment captured by a video camera and the video camera itself.
Figure 2A:
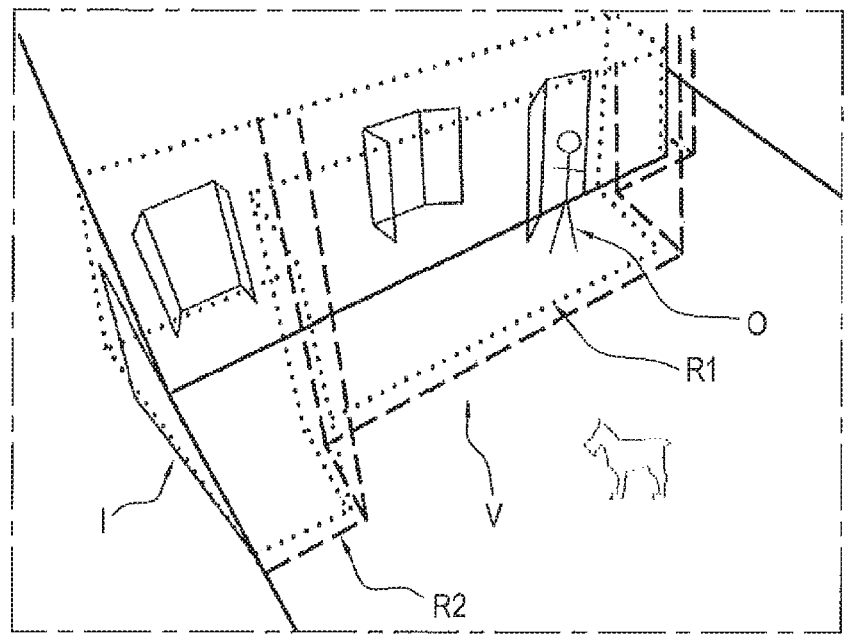
FIG. 2A represents an image of an outside environment actually captured by a video camera with the insertion of authorised volumes (dotted line) and unauthorised volumes (dashed line)
Figure 2B:
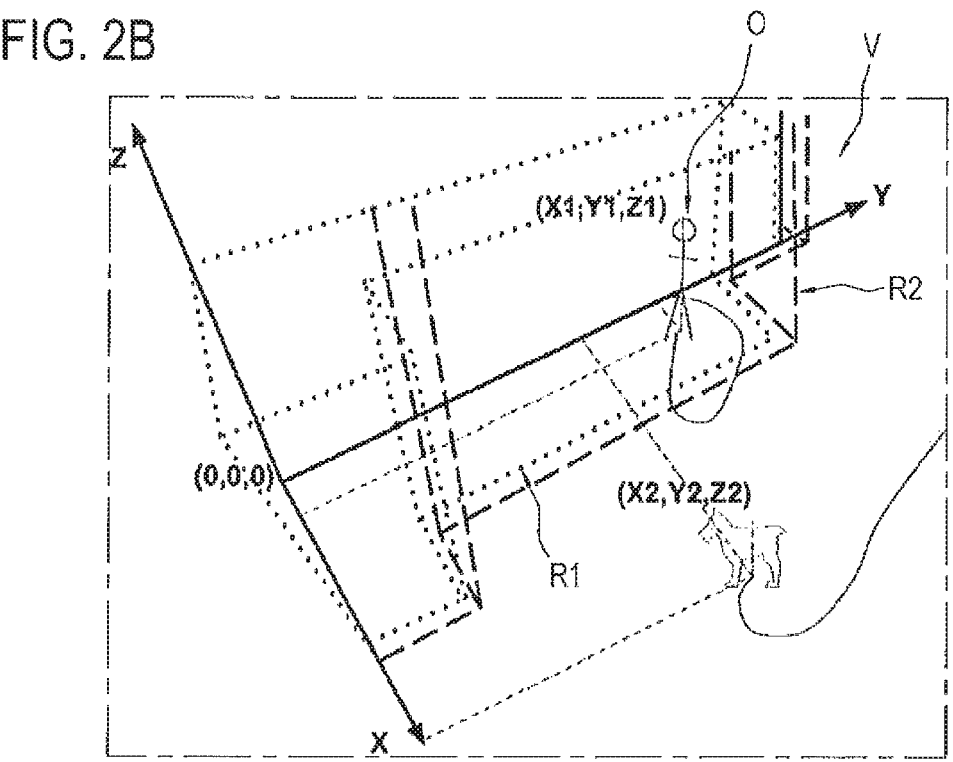
FIG. 2B represents an image of an outside environment after processing where, whilst there are still the authorised and unauthorised volumes, the background disappears and a moving person and a dog can be seen.

This invention defines a device 1 for surveillance of a predetermined volume.

Preferably, the device 1 comprises at least one video camera 2 designed to acquire images of a predetermined volume V (being monitored).

Also, preferably, the device 1 also comprises processing means 3, designed for processing the images acquired in the manner described below.

The surveillance device 1 also preferably comprises a supporting body 4 to which the video camera 2 and the processing means 3 are constrained.

Also defined is a surveillance system, comprising a plurality of devices 1 as described above.

Preferably, the to or more devices are each provided with a data receiving and transmitting module 8, designed to exchange information relating to the moving object with one more of the other devices 1.

It should be noted that, preferably, according to this aspect, each device is equipped with respective processing means 3 and is therefore independent of the other devices 1.

In other words, preferably and advantageously, each device 1 is independent and a single central control unit which coordinates and controls all the devices 1 is not provided.

Advantageously, this structure with distributed electronics (without a central control unit) allows the efficiency and the general reliability of the system to be increased, since the failure of one of the devices 1 does not have an impact on the remaining devices, which continue to operate perfectly efficiently.

The architecture of this system can be defined as "peer to peer".

Therefore, the module 8 for receiving and transmitting data of a device 1 is configured for communicating with the data receiving and transmitting module 8 of one or more of the remaining devices 1.

In practice, according to this aspect, information is exchanged which allows the surveillance action of the system to be made more efficient, reducing the false errors.

In effect, for example, if at least two of the devices 1 are positioned so as to capture images of volumes which are close to each other or partly superposed, it is possible to keep track of the path of a moving object from one surveillance volume to another, that is to say, by an exchange of information between the two devices 1 (a first and a second device) it is possible for the second device 1 to identify the moving object at the entrance to the relative surveillance volume as well as the moving object O leaving the surveillance volume of the first device (as a function, for example, of predetermined criteria of comparison between the last position detected in the first volume and the first position detected in the second volume).

Consequently, according to this aspect, the various devices 1 may keep track of the movement of the objects O moving between different surveillance volumes.

In this way, advantageously, it is possible to reduce the so-called false alarms, and increase the overall security of the system.

A monitoring and surveillance method is described below which can be implemented by the above-mentioned device 1.

According to this aspect, the method for surveillance of a predetermined volume V, comprises the following steps:
  a) preparing at least one video camera 2 designed to acquire images I of a predetermined volume V which is under surveillance;
  b) defining in the images at least a first predetermined authorised region R1 (two-dimensional and/or three-dimensional) having a first level of authorisation and at least a second predetermined unauthorised region R2,
  c) analysing the images I to identify a moving object O and to identify at least one position associated with the moving object O;
  d) comparing the position of the moving object O identified with the positions of the above-mentioned authorised region R1 and/or unauthorised region R2;
  e) making available an alarm indication depending on the results of the comparison.

Preferably, the step of analysing the images I to identify the position of a moving object O comprises a step of analysing a plurality of images I which are consecutive in terms of time, so as to identify positions of the object in each of the images I and to determine a movement trajectory of the object O, the method also comprising a step of making available an indication depending on the movement trajectory of the object O relative to the positions of the authorised and unauthorised areas (R1, R2).

It should be noted that, advantageously, according to this aspect, a step is performed of tracing the path of the object O moving inside the volume V subject to surveillance.

It should be noted that, advantageously, according to this aspect, it is possible to selectively activate the alarm signal according to the trajectory followed by the moving object detected in the volume V monitored relative to the above-mentioned authorised and unauthorised areas (R1, R2).

If, for example, a detected moving object passes from an authorised zone to an unauthorised zone, it is possible to inhibit the alarm signal since it is assumed that access to the unauthorised zone by passing through an authorised zone is not a source of potential dangers; vice versa, the direct entrance in an unauthorised zone is the source of potential dangers and a warning signal is therefore provided.

It should be noted that, preferably, the step of analysing the images I to identify a moving object O and to identify at least one position associated with a moving object O in the predetermined volume comprises a step of acquiring a plurality of images I to identify a static content associated with the images I.

This static content is relative to a background of the image, that is to say, it represents the static content present in the volume subject to surveillance.

According to this aspect, the step of analysing the images I to identify a position of a moving object O in the predetermined volume V comprises a step of removing the static content (or background) from at least one image I acquired, for identifying the moving object O.

In effect, as one can easily understand, the moving object O should not normally form part of the static content of the image I.

The subtraction of the static content from the image captured ensures that an object not forming part of the background of the environment monitored can be immediately highlighted, that is, presumably a moving object which has entered the volume subject to surveillance.

Advantageously, in this way, an object present in the volume subject to surveillance is identified in a particularly simple, fast and highly reliable manner.

It should be noted that the step of analysing the images I to identify a position of a moving object O in the predetermined volume comprises a step of identifying a position of the moving object O according to a three-dimensional system of coordinates.

In other words, according to this aspect, at least one three-dimensional coordinate (in Cartesian or polar coordinates) is associated with the moving object.

Preferably, the step of analysing the images I to identify the position of a moving object O in the predetermined volume monitored comprises a first step of identifying the position of the moving object O in the image I and a second step of identifying the three-dimensional position of the moving object O using a functional relationship between two-dimensional points of the image I and three-dimensional coordinates of the predetermined volume V.

In other words, the position (of one or more points) of the object O moving in the image I is converted into the three-dimensional position of the object O in the predetermined surveillance volume.

Preferably, but not necessarily, the method comprises a step of attributing three-dimensional coordinate.

According to another aspect, the method comprises a step of determining the volume of the object O detected.

According to this aspect, the alarm signal associated with the moving object is made available or inhibited according also to the determined volume of the reference object O.

Advantageously, according to this aspect, on the basis of the volume it is possible to distinguish a person (that is, a potentially dangerous intruder) from a domestic animal or other type of moving object.

In effect, the volume occupied by a person is without doubt different from the volume occupied by a domestic animal.

It should therefore be noted that, according to this aspect, a comparison is preferably made between the volume detected and one or more threshold values (to allow a person to be distinguished from other types of objects/animals) and the alarm signal inhibited on the basis of the outcome of the comparison.

Advantageously, if the comparison shows that the volume of a moving object is not compatible with that of a person, the alarm signal associated with that moving object could be inhibited.

Preferably, according to this aspect, the volume of the object O is calculated on the basis of the three-dimensional coordinates associated with a plurality of points of the object O (preferably on the basis of the coordinates of one or more points of the outline, for example of the left, right, upper and lower end points of the object O).

According to another aspect, it is possible to inhibit from the analysis a predetermined region of the image I, that is, a zone of the monitored volume V, that is, the method comprises a step of establishing a region of the image for exclusion from the analysis, which will not be analysed for the purposes of identifying the moving object and the position of the moving object.

It should be noted that this aspect can prove extremely useful in order to exclude portions of the observation volume from the analysis in which the individual purchasing the security device performs particularly intimate activities (for example, bathroom areas).

Also, according to this aspect, it is possible to also exclude some zones from the analysis in which it is assumed there are no accesses (for example, zones corresponding to vertical walls of buildings not provided with doors and windows), thus making the analysis faster.

It should be noted that the authorised and unauthorised areas are three-dimensional volumes, that is to say, zones of the corresponding image in the physical space of the volume monitored to a three-dimensional volume with a predetermined geometry.

In this regard, it should be noted that, preferably and without limiting the scope of the invention, the authorised and unauthorised areas have a geometry in the form of a parallelepiped, sphere, or cylinder.

According to yet another aspect, it should be noted that the method may comprise a step for identifying a non-operational meteorological condition.

According to this aspect, the method analyses the image I to identify the presence of a non-operational meteorological condition, corresponding to a condition of difficult or practically impossible detection of the position of the moving object by analysing the image.

More specifically, the method comprises a step of analysing the images I to identify the presence of fog and/or rain and/or hail and/or snow in the images I, and a step of inhibiting the alarm indication if fog and/or rain and/or hail and/or snow is identified.

In the case of detection of a non-operational meteorological condition, the method inhibits the alarm signal until the non-operational meteorological condition remains, that is, until the analysis of the image I has identified the absence of a non-operational meteorological condition.

It should be noted that in certain geographical zones there are often phenomena, such as particularly dense fog, which prevent normal operation of the device 1.

In the presence of particularly poor weather for detection purposes, it is worth being able to switch off the device 1 substantially automatically, thus avoiding false alarm signals.

It should be noted that, preferably, the method generates a non-operational signal of the system, and transmits this signal remotely.

In this way, advantageously, the supervisor of the system or the purchaser of the system is notified of the non-operational condition of the system due to poor meteorological conditions, so that suitable measures can be adopted.

According to another aspect, the step of analysing the images I to identify the position of a moving object O in the predetermined volume V comprises a step of analysing images which are consecutive in terms of time and the method comprises, in the case in which the object O is detected in first images and is not detected in second images which come after the first in terms of time, a step of saving the last position of the object O detected.

Advantageously, according to this aspect, it is possible to attribute the position information stored to an object which, after being stationary for more than a predetermined time or being positioned in the volume monitored in a condition which is not visible for the video camera 2, is again detected.

In other words, it is possible keep track of the movement performed by the object O identified, to generate, or not, an alarm signal as a function of predetermined criteria.

This reduces the chance of and prevents, advantageously, a moving object which is not a source of potential danger from being identified as a danger and an alarm signal being provided.

This is particularly useful to prevent lengthy stoppages or the location in a shadow area of a person inside unauthorised regions from generating alarm situations.

According to another aspect, the step of defining in the images at least a first authorised region R1 and a second unauthorised region R2 comprises a step of defining at least a further region which has a second authorisation level.

In general, is should be noted that N authorisation levels and M regions (less than or equal to N) may be defined.

According to this aspect, the method comprises the possibility of making available different warning signals for each zone.

More generally, it should be noted that there can be any number of authorised first regions R1 and any number of authorised second regions R2 inside a predetermined volume subject to surveillance (image).

In other words, it is possible to define at least another region having different access levels.

According to another aspect, the sensor 2 must be suitably calibrated.

Given two reference systems, the first two-dimensional relative to the image captured by the video camera and the second three-dimensional relative to the zone captured by the video camera, the calibration makes it possible to determine the transfer function (two-way) necessary to associate two-dimensional coordinates of the image to three-dimensional coordinates and vice versa.

More specifically, the calibration makes it possible to determine the transfer function (two-way) necessary to project the 2D image of a mass moving in the volume subject to surveillance in three-dimensional space, and in particular the X, Y coordinates on the ground plane and the Z coordinate corresponding to the height of the mass above ground.

Every pixel in the frame of the moving mass is translated into the corresponding point of the 3D space which the video camera is capturing.

The calibration starts with the determination of the origin of the two reference systems: the origin r0, c0 of the image captured by the video camera in the two-dimensional reference system and the origin of the system of Cartesian axes X0, Y0, Z0 of the physical area captured by the video camera in the three-dimensional reference system.

Each pair of values r1, c1 relative to a point of the image is referred to the origin of the two-dimensional reference system.

Each triple containing the coordinates X1, Y1, Z1 of a point of the area captured by the video camera is referred to the origin of the Cartesian axes in the three-dimensional reference system.

The origin of the two-dimensional reference system may be at any point of the image. For sake of simplicity, it is positioned in a corner of the image: for example, the top left corner.

The origin of the three-dimensional reference system may be located at any point of the area captured by the video camera. For sake of simplicity, this is positioned at an end of the ground plane which could coincide with the intersection of masonry structures or fences and therefore depends on the image contained in the frame and the shot derived from the installation of the video camera.

The second calibration step consists in determining in the image produced by the video camera the ground plane/planes, that is to say, the areas on which the movement relative to the next analysis potentially occurs. The planes may be horizontal or inclined.

The third calibration step consists in associating with the coordinates r, c on the image of each point P of the ground planes, by knowing the known reference measurements present in the context captured (doors, windows, walls, etc.), respecting proportionality criteria and proceeding by interpolation, the three-dimensional coordinates X, Y on the ground plane(s) of the actual area captured by the video camera.

The fourth step of the calibration obtains a function needed to determine the height above the ground of a moving mass, that is to say, the three-dimensional coordinate Z.

In order to determine Z the difference is calculated between the upper outlines and the ground plane for reference present in the image, obtaining a distance expressed in pixels on the two-dimensional image. By comparing this distance to the actual height of each reference, a coefficient is obtained to be associated with the predetermined position X, Y of the corresponding point on the ground plane.

It is possible to associate more than one coefficient to the same point X, Y on the basis of the height of the reference above ground.

With the assumption that the bodies can move exclusively on ground planes, and adhering to them, once their position X, Y has been determined on the ground plane using the lower boundaries, it is possible to determine their area occupied and their height. These results are used to calculate an estimate of the volume of the moving body.

If movement (variation in the number of pixels above the threshold) is highlighted in zones which are not considered as walkable, in other words not referable to positions on ground planes, this movement is always considered as unauthorised.

In order to consider the effects of any distortions introduced by the lenses used by the video camera—which can be negligible but also significant (e.g. fisheye lens)—the calibration operations also include, if necessary, the operation for correction of the transfer function determined previously.

The correction may be made empirically by increasing the number of known references in the regions with greater distortions and, therefore, lowering the approximation introduced by the calculation of the transfer function by interpolation.

According to another aspect, the surveillance device 1 can be controlled and/or programmed remotely.

In this regard, a user can command or control the surveillance device by connecting to it remotely.

It should be noted that it is possible to adjust in real time the status of the surveillance device 1 and the images captured by the device, and to send commands of any type to the device.

According to yet another aspect, the device 1 may create a local network and set up a two-way radio connection towards sensors or actuators.

Further aspects are described below relating to a specific embodiment of the method for which the basic characteristics have already been described above.

In this embodiment, at least one authorised zone (corresponding to a zone of the authorised volume) and at least one unauthorised zone (corresponding to a zone of the unauthorised volume) is defined in the image I.

According to this aspect, the method comprises further steps:
d1) preparing a status variable able to adopt a first value indicative of the presence of at least one person in the volume (V) and a second value indicative of the absence of persons in the volume (V);
e1) following identification of a movement, making available an alarm indication if the status variable has the second value and the movement was initially detected in the unauthorised zone;
f1) following identification of the movement, if the status variable has the second value and the movement was initially detected in the authorised zone, setting the status variable to the first value and resetting and activating a countdown;
g1) following identification of a movement, if the status variable has the first value, activating a countdown;
h1) setting the status variable to the second value if the countdown has finished.

According to another aspect, the authorised zone at least partly overlaps the unauthorised zone and in step e1) an alarm indication is made available if the status variable has the second value and the movement was initially detected only in the unauthorised zone.

According to another aspect, there is an initialisation step in which the status variable is set:
to the first value if a movement is detected within the volume (V) for a predetermined time;
to the second value if no movement is detected within the volume (V) for a predetermined time.

It should be noted that, according to an aspect, the authorised zone comprises at least one portion which is completely inside the unauthorised zone.

The invention described above is susceptible of industrial application and may be modified and adapted in several ways without thereby departing from the scope of the inventive concept. Moreover, all the details of the invention may be substituted with technically equivalent elements.

The invention claimed is:
1. A method for surveillance of a predetermined volume, comprising the following steps:
a) providing a video camera configured to acquire images of a predetermined volume which is under surveillance;
b) defining in the images a first portion of the predetermined volume that is an authorized first region having a first level of authorization and a second portion of the predetermined volume that is an unauthorized second region;
c) performing consecutive images analysis on the images to identify a moving object in the predetermined volume and to track a path of the moving object in the predetermined volume;
d) comparing the path of the moving object with positions from both the authorized first region and the unauthorized second region;
e) selectively activating an alarm indication based on the comparing the path of the moving object, as follows:
always inhibiting the alarm indication if the moving object passes from the authorized first region to the unauthorized second region;
activating the alarm indication if the moving object enters the unauthorized second region from a third region that is outside the predetermined volume and is not under surveillance;

f) keeping the method operational during a presence of the moving object in the unauthorized second region.

2. The method according to claim 1, wherein the step of performing consecutive images analysis on the images comprises a step of analyzing a plurality of images which are consecutive in terms of time, to identify positions of the moving object in each of the images and to determine a movement trajectory of the moving object, the method also comprising a step of activating the alarm indication depending on a movement trajectory of the moving object relative to the positions of the authorized first region and the unauthorized second region.

3. The method according to claim 2, wherein the step of performing consecutive images analysis on the images comprises:
- a step of acquiring a plurality of images and identifying a static content associated with the images, and
- a step of removing the static content from at least one of the plurality of images acquired, for identifying the moving object.

4. The method according to claim 1, wherein the step of performing consecutive images analysis on the images comprises a step of identifying a position of the moving object according to a three-dimensional system of coordinates.

5. The method according to claim 4, wherein the step of performing consecutive images analysis on the images comprises a first step of identifying a position of the moving object in the image and a second step of identifying a three-dimensional position of the moving object in the predetermined volume by using a functional relationship between two-dimensional points of the image and three-dimensional coordinates of the predetermined volume.

6. The method according to claim 4, comprising a step of assigning three-dimensional coordinates to one or more points which are part of an outline of the moving object.

7. The method according to claim 4, comprising a step of determining a volume of the moving object and selectively activating the alarm indication also depending on the volume of the moving object.

8. The method according to claim 1, wherein the step of performing consecutive images analysis on the images comprises a step of analyzing images which are consecutive in terms of time and, in a case in which the moving object is detected in first images and is not detected in second images which come after the first images in terms of time, saving a last position of the moving object detected.

9. The method according to claim 1, wherein the step of defining in in the images an authorized first region and the unauthorized second region comprises a step of defining at least one further region which has a second level of authorization different from the first level of authorization.

10. The method according to claim 1, and further comprising:
- a step of analyzing the images to identify in the images whether there is a presence of at least one chosen from fog, rain, hail and snow, and
- a step of inhibiting the alarm indication if there is a presence of the at least one chosen from fog, rain, hail and snow.

11. The method according to claim 1, and further comprising a step of establishing a region of the images which is excluded from the analysis.

12. A device for surveillance of a predetermined volume, comprising:
- a video camera configured to acquire images of a predetermined volume;
- a processor configured to:
  a) define in the images a first portion of the predetermined volume that is an authorized first region having a first level of authorization and a second portion of the predetermined volume that is an unauthorized second region;
  b) perform consecutive images analysis on the images to identify a moving object in the predetermined volume and to track a path of the moving object in the predetermined volume;
  c) compare the path of the moving object with positions from both the authorized first region and the unauthorized second region;
  d) selectively activate an alarm indication based on the comparing the path of the moving object, as follows:
    always inhibit the alarm indication if the moving object passes from the authorized first region to the unauthorized second region;
    activate the alarm indication if the moving object enters the unauthorized second region from a third region that is outside the predetermined volume and is not under surveillance;
  e) keep the device for surveillance operational during a presence of the moving object in the unauthorized second region.

13. The surveillance device according to claim 12, comprising a supporting body to which the video camera and the processor are constrained.

14. A surveillance system, comprising a plurality of devices according to claim 12, wherein each of the plurality of devices includes a data receiving and transmitting module, configured to exchange information relating to the moving object with one more of others of the plurality of devices.

15. The surveillance system according to claim 14, wherein at least two of the plurality of devices are positioned in such a way as to acquire images of volumes which are near one another or partly overlapping, and wherein the processor of the at least two of the plurality of devices are operatively connected to one another to exchange information relating to the moving object.

* * * * *